Aug. 12, 1958 G. M. MAS 2,846,894
SPEED VARIATOR
Filed Aug. 4, 1953
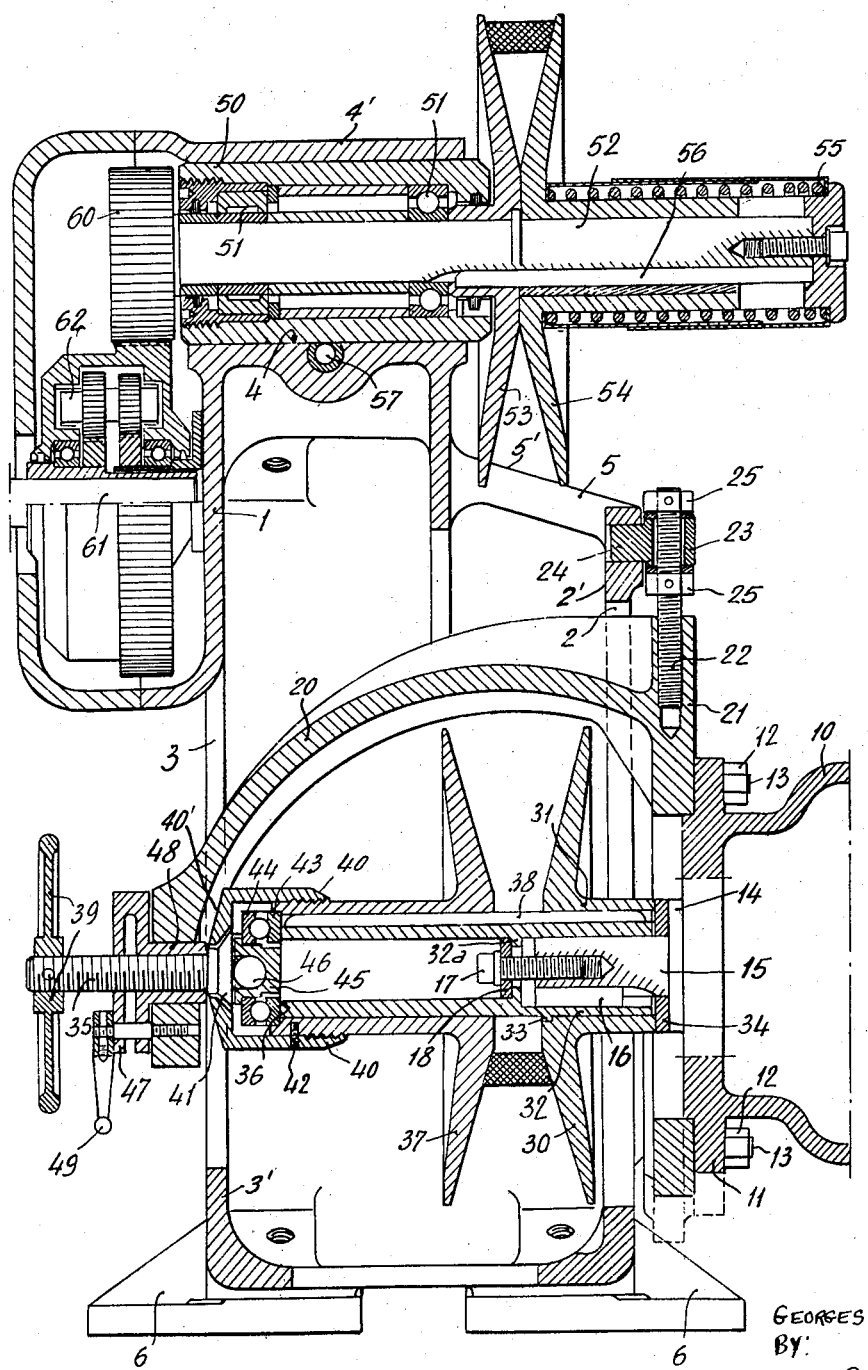
INVENTOR:
GEORGES MARIUS MAS
BY:

United States Patent Office 2,846,894
Patented Aug. 12, 1958

2,846,894
SPEED VARIATOR

Georges Marius Mas, Les-Clayes-sous-Bois, France, assignor to Societe Industrielle de Transmissions, Paris, France Application August 4, 1953, Serial No. 372,358

Claims priority, application France May 7, 1953

3 Claims. (Cl. 74—230.17)

When it is desired to make up a speed variator with two variable diameter pulleys having conical flanges, it is necessary to ensure a correct lining up of the belt, whatever may be the transmission ratio determined by the positions of the flanges.

There are three solutions to this problem at present:

First solution: The two flanges of each one of the two pulleys are displaced simultaneously and symmetrically with respect to the middle plane of the belt which, consequently, does not vary.

Second solution: Each pulley is made up of two flanges, one of them fixed, the other one movable; the fixed flanges of the driving and driven shafts are arranged on both sides of the middle plane of the belt, hence the name of "head to tail" assembly. The belt middle plane is displaced but remains always parallel with itself.

Third solution: The pulleys are comprised, as in the second solution, by fixed and movable flanges, but the fixed flanges are arranged on the same side of the belt middle plane and one of the shafts carrying one of the fixed flanges is displaced axially. As in the second solution, the belt middle plane moves and remains always parallel with itself.

The first solution has been practically abandoned, due to the fact that the number of controls for the flanges is twice the number of controls in the two other solutions which results in mechanical complications.

The second, so-called "head to tail" solution offers usually difficulties for the replacement of belts due to the fact that the controls are on both sides of the belt and hinder or prevent the removal or placing in position of the belts.

The third solution offers the difficulty of displacing a shaft and the parts supporting it.

An object of the present invention is a speed variator assembled "head to tail," not offering the above mentioned drawback for this type of assembling.

This result is obtained, according to the present invention due to the fact that the control for the movable flange of the driving pulley rests at one point of an arm associated with the bearing of the driving shaft and passing between the two strands of the belt, said point and said bearing being on opposite sides of the belt.

Preferably, the assembly formed by the motor and said arm is secured on a casing or frame.

In particular:

(a) Said frame comprises a housing for accommodating the fixed portion of the driven pulley.

(b) The driving pulley is associated with a driven pulley the movable flange of which is pushed back automatically by a spring.

(c) The hub of the movable flange of the driving pulley is displaced axially in a direction opposite that of the action of the belt thereon, through a bearing and in the other direction, in case the action of the belt should be insufficient, by an intermediate part secured to the hub and bearing on a projecting portion of the control rod for the driving pulley.

By way of example only, the appended drawing represents in section a speed variator according to the present invention (the variable diameter pulleys being shown in the flange position giving the driven pulley the minimum speed).

This speed variator comprises a casing 1, a motor 10, a controlling assembly or adjusting means 35, 39—49 for the driving pulley and a driven pulley assembly 50—57, these two assemblies being secured in a simple manner and readily removable on the casing or frame 1.

The casing 1 comprises a pair of side walls, 2' and 3' respectively formed with apertures 2 and 3 for respectively receiving the motor 10 and the adjusting means 39—49 of the driving pulley, a housing portion formed with a bore 4 for receiving the driven pulley assembly 50—57 and an intermediate wall 5' formed with a hole 5 for the passage of the V belt connecting the two pulleys. The frame 1, including the sleeve 50 located in the bore 4 in the housing portion of frame 1, the bearings 51 located in sleeve 50, and the shaft 52 comprise the support means of the apparatus. In addition, this casing comprises lugs 6 of the type of those described in the French Patent 1,048,001.

The motor 10 comprises a flange 11 and on its shaft 15 is mounted a sleeve 32; this sleeve is secured axially on said shaft in one direction by the abutting of an inner shoulder 32a against a washer 18 attached at the end of the shaft 15 by a screw 17 and in the other direction by abutting against a washer 34 bearing against an outer shoulder 14 of the shaft 15. This sleeve 32 is driven in rotation by the shaft 15 by means of a key 16. On this sleeve 32 are mounted the two flanges 30 and 37 of the driving pulley. The hub 31 of the fixed flange 30 is prevented from moving longitudinally in one direction by an outer shoulder 33 of the sleeve 32 and in the other direction by the washer 34. The movable flange 37 can move axially on the sleeve 32. The two flanges 30 and 37 are driven in rotation by the sleeve 32 by means of a key 38. Sleeve 32 and key 38 provide guide means for the movable flange 37 of the driving pulley.

The control for the flange 37 is mounted on a support or mounting means 20, 21, consisting of a shoe 21 and an arm 20.

The flange 11 is of the motor is secured on the shoe 21 by means of four nuts 12 capable of being screwed on four threaded rods 13 associated with the shoe 21. The latter, in turn, is secured on the casing 1 by the introduction of four studs associated therewith in stud holes provided in the shoe 21. Said studs and stud holes are not visible on the drawing. The final position of the shoe 21 on the casing 1 is adjusted by means of a threaded rod 22 which can be screwed in the shoe 21 and carrying a smooth sleeve 23, one stud of which 24 enters a blind hole in the casing 1, and the rod 22 is held in position on the sleeve 23 by two nuts 25. Sleeve 23, bolt 22 and nuts 25 form screw means to adjust the position of the mounting means 20, 21 with respect to the frame 1. It will be easily realized that by screwing the rod 22 more or less into the shoe 21, the latter may be brought to the desired position.

The control for the movable flange 37 is mounted in a bore of the arm 20 of the support 20, 21. The displacements of the flange 37 are controlled by a hand wheel 39, screwed and locked on a threaded screw 35, meshing with the inner thread of a nut 48 attached on the arm 20. A tubular member 40 having an annular end wall 40' partly surrounding the enlarged end 41 of the screw 35 is screwed on the hub of the flange 37 and immobilized by a pin 42. For displacing the flange 37 towards the other flange 30, the hub of the flange 37 is associated with one ring 43 of a ball thrust bearing 43, 44 the other ring of which 44 is associated with the rod 35 through a cup 45 and a ball 46. The spacing of the flange 37 with respect to the flange 30 is effected normally by the action of the belt and possibly by the action of the shoulder 41 of the rod 35 on the part 40. The handwheel 39 may be immobilized in rotation by means of a lever 49 by an elastic deformation of an element 47 and nut 48. This nut forced in the bore of the arm 20 cooperates with the threading of the rod 35.

The driven pulley assembly comprises a rigid casing 50, containing bearings 51 supporting a shaft 52. The latter carries two flanges, one flange 53 not displaceable axially and a flange 54 which can be displaced axially. The latter is constantly pushed by a spring 55. A key 56 associates in rotation the shaft 52 and the flanges 53 and 54. The casing 50 is secured on the case 1 axially, in a known manner by the screwing of a threaded rod 57. On the end of the output shaft 52 outside the case 1, a reduction gear 60 is mounted. Since the rotational speed of shaft 52 is too high for direct transmission, speed reduction means of known design are interposed, as indicated by reference numeral 62, bringing the number of revolutions of the output shaft 61 within required range. These various reduction systems may easily be placed in position above the control wheel 39.

For assembling the variator on the case 1, the receiving pulley assembly is placed in the bore 4 of the case 1, immobilizing temporarily the case 50 by means of the rod 57. Further, the motor-driving pulley assembly is placed in the holes 2 and 3 of the frame 1, the motor being secured by its flange 11 on the shoe 21 and the assembly being secured on the case 1 by studs, not shown, and being adjusted in position by means of the rod 22. The adjustment of the pulley-motor assembly is so determined that the planes of the small diameters of the fixed flanges 30 and 53 be at a predetermined distance known by experience and the driven pulley assembly 50—56 is then locked on the case 1 by means of the screw 57.

Said variator offers on the similar devices the following differences and advantages:

(a) For modifying the transmission ratio of the variator, it is sufficient to turn the handwheel 39, which displaces the flange 37 but does not change the position of the motor 10. On the other hand, the movable flange 54 automatically assumes the desired position owing to the spring 55.

(b) Due to the fact that the driven pulley 50—57 alone is automatically returned, the variations of the resistant torque cause only a small speed variation for the driven member.

(c) The fact that the output from the driven shaft 52 is on the side of the casing 1 opposite that of the motor 10, facilitates the assembling of speed reductors at the output, the reduction ratios of which are stepped over a wide range, for instance from 2 to 1200; the large reductions may be obtained by the use of planetary trains, an example of which is given in the appended drawing.

(d) The variator assembly with its motor and its reducer if any forms a self contained assembly capable of being displaced as needed with minimum costs for disassembling and re-assembling.

(e) Changing the belt is simple, it is removed from the pulley 53—54, passed through the hole 5 and then through the hole 3. The placing of a belt in position is effected by a reverse operation and as simply.

(f) The two assemblies comprising, on the one hand the motor unit and on the other hand the driven unit with or without a reduction system form self contained assemblies which may easily be placed in casings other than the one shown, for instance in machine-tool frames.

What is claimed is:

1. A variable speed transmission comprising, in combination, a driven pulley composed of a pair of independent, coaxial, frusto-conical driven flanges; support means supporting said driven pulley for rotation about its axis and supporting at least one of said driven flanges for movement toward and away from the other of said driven flanges, said support means having a free end portion extending from one side of said driven pulley; a driving pulley having an axis parallel to that of said driven pulley and composed of a pair of independent, coaxial, frusto-conical driving flanges; a motor coaxial with said driving pulley, fixed to one of said driving flanges thereof for rotating said one driving flange, and located at the side of said one driving flange opposite from the other of said driving flanges so that said one driving flange is loacted between said motor and said other driving flange; guide means extending along the axis of said driving pulley and guiding said other driving flange for movement toward and away from said one driving flange; a belt passing about and operatively engaging said pulleys for transmitting a drive from said driving to said driven pulley; adjusting means operatively connected to said other driving flange for adjusting the distance thereof from said one driving flange, said adjusting means being located in its entirety at the side of said other driving flange opposite from said one driving flange so that said other driving flange is located between said adjusting means and said one driving flange, said driving pulley, guide means, and adjusting means all being spaced from said support means, and said adjusting means having a part which remains stationary with respect to said support means; and mounting means mounting said motor on said support means and connected to said support means only at the same side of said belt as said one driving flange, said mounting means including an arm extending from said side of said belt through the runs thereof and carrying said part of said adjusting means so that said belt may be removed from said driven pulley, passed about said free end portion of said support means, removed from said driving pulley, and passed about said adjusting means to be removed from the apparatus without any disassembly thereof.

2. A variable speed transmission comprising, in combination, a driven pulley composed of a pair of independent, coaxial, frusto-conical driven fianges; support means supporting said driven pulley for rotation about its axis and supporting at least one of said driven flanges for movement toward and away from the other of said driven flanges, said support means having a free end portion extending from one side of said driven pulley; a driving pulley having an axis parallel to that of said driven pulley and composed of a pair of independent, coaxial, frusto-conical driving flanges; a motor coaxial with said driving pulley, fixed to one of said driving flanges thereof for rotating said one driving flange, and located at the side of said one driving flange opposite from the other of said driving flanges so that said one driving flange is located between said motor and said other driving flange; a sleeve coaxial with said driving pulley and extending from said one driving flange slidably through said other driving flange to support the latter for movement toward and away from said one driving flange; a bearing carried by said other driving flange and located beyond said sleeve at the end thereof distant from said motor; a screw member substantially coaxial with said sleeve, having an enlarged end engaging said bearing, and located on the side of said bearing opposite from said sleeve; a tubular member having an annular end wall at least partly surrounding said enlarged end of said screw member at a face thereof directed away from said bearing and having an end portion distant from said annular end wall fixed to said other driving flange; a nut threadedly engaging said screw member; a belt passing about and operatively engaging said pulleys for transmitting a drive from said driving to said driven pulley; and mounting means mounting said motor on said support means and connected to the latter only at the same side of said belt as said one driving flange, said mounting means including an arm extending from said side of said belt between the runs thereof and fixed to said nut to maintain the latter stationary with respect to said support means, whereby turning of said screw member adjusts the distance between the flanges of said driving pulley and whereby said belt may be removed from the apparatus without disassembly thereof.

3. A variable speed transmission comprising, in combination, a frame having a housing portion open at one end, having a pair of side walls each of which is formed with an opening passing therethrough, and having an intermediate wall located between said side walls and housing portion, extending laterally beyond said open end of said housing portion, and also being formed with an opening passing therethrough; a driven pulley located outside of said housing portion of said frame adjacent said open end thereof and including a pair of independent frusto-conical driven flanges; carrying means extending into said housing portion of said frame to be carried thereby and engaging said driven pulley to carry the latter for rotation about its axis and to carry at least one of said driven flanges for movement toward and away from the other of said driven flanges, said driven pulley being located opposite said intermediate wall of said frame, said carrying means having a free end portion extending from one side of said driven pulley; a driving pulley located between said side walls of said frame and opposite said intermediate wall thereof, said driving pulley being composed of a pair of independent frusto-conical driving flanges; a motor located outside of said frame adjacent one of said side walls thereof and having a shaft extending toward the opening in said one side wall; means fixing the flange of said driving pulley nearest said motor to said shaft thereof; guide means located between said side walls and engaging the other of said driving flanges to support the same for movement toward and away from said one driving flange; adjusting means connected to said other driving flange for adjusting the position thereof with respect to said one driving flange, said adjusting means extending through the opening in the other of said side walls in said frame so as to be accessible at the exterior of said frame; a belt passing through said opening in said intermediate wall and about said pulleys in driving engagement therewith to transmit the drive from said driving to said driven pulley; a shoe fixed to said motor, located between the same and said one side wall, and being connected to said one side wall of said frame to mount said motor on said frame; and an arm fixed to said shoe, extending from the latter through said opening in said one side wall and through the runs of said belt, and fixedly connected to a part of said adjusting means to support the same, said arm, adjusting means, and driving pulley being out of contact with said frame so that said belt may be removed from the apparatus without any disassembly thereof.

References Cited in the file of this patent

UNITED STATES PATENTS

| | | |
|---|---|---|
| 1,662,654 | Abbott | Mar. 13, 1928 |
| 1,738,552 | Abbott | Dec. 10, 1929 |
| 2,021,136 | Reeves | Nov. 19, 1935 |
| 2,140,942 | Reeves | Dec. 20, 1938 |
| 2,235,333 | Reeves | Mar. 18, 1941 |
| 2,278,739 | Reeves | Apr. 7, 1942 |
| 2,382,935 | Armitage | Aug. 14, 1945 |
| 2,522,352 | Eserkaln | Sept. 12, 1950 |
| 2,651,210 | Clark | Sept. 8, 1953 |
| 2,678,566 | Oehrli | May 18, 1954 |

FOREIGN PATENTS

| | | |
|---|---|---|
| 267,179 | Switzerland | June 1, 1950 |